(12) United States Patent
Sarafa et al.

(10) Patent No.: US 9,301,110 B1
(45) Date of Patent: Mar. 29, 2016

(54) MULTIMODAL COMMUNICATION SYSTEM AND METHOD

(71) Applicant: Google Inc., Mountain View, CA (US)

(72) Inventors: Randall Sarafa, San Francisco, CA (US); Wei Huang, Mountain View, CA (US); Mark Wagner, Mountain View, CA (US); George Xie, Mountain View, CA (US)

(73) Assignee: Google Inc., Mountain View, CA (US)

( * ) Notice: Subject to any disclaimer, the term of this patent is extended or adjusted under 35 U.S.C. 154(b) by 187 days.

(21) Appl. No.: 14/066,546

(22) Filed: Oct. 29, 2013

(51) Int. Cl.
*H04W 4/00* (2009.01)
*H04M 3/42* (2006.01)
*H04W 4/14* (2009.01)
*H04L 12/58* (2006.01)

(52) U.S. Cl.
CPC *H04W 4/14* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 8,219,126 B2 | 7/2012 | Marlow et al. | |
| 8,380,858 B2 | 2/2013 | Froelich | |
| 2011/0151850 A1* | 6/2011 | Haaparanta et al. | 455/415 |
| 2011/0179126 A1 | 7/2011 | Wetherell et al. | |
| 2013/0007122 A1 | 1/2013 | Su | |
| 2013/0041957 A1 | 2/2013 | Davenport et al. | |
| 2013/0165166 A1* | 6/2013 | Appelman | 455/466 |
| 2013/0218983 A1* | 8/2013 | Richard | 709/206 |
| 2014/0146957 A1* | 5/2014 | Thange | 379/221.14 |

* cited by examiner

*Primary Examiner* — Erika A Washington
(74) *Attorney, Agent, or Firm* — IP Spring

(57) ABSTRACT

A method and computing system for establishing a text-based communication session between a first user and one or more other users of a social network. A private ID is identified for a specific user chosen from the one or more other users. One or more remote contact databases are queried to associate the private ID with one or more telephone numbers for the specific user. An SMS communication session is enabled between the first user and the specific user based, at least in part, upon the one or more telephone numbers.

17 Claims, 5 Drawing Sheets

MULTIMODAL COMMUNICATION SYSTEM AND METHOD

TECHNICAL FIELD

This disclosure relates to multimodal communication systems and, more particularly, to multimodal communication systems within a social network.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

Another such use of the Internet is to allow people to communicate with each other within social networks via multi-user, text-based communication systems (such as within a text message session). Since social networks often include proprietary, text-based communication systems, in the event that a user of the social network also wishes to communicate via a non-proprietary, text-based communication system (such as a standard SMS text messaging system), the user may need to exit the social network to effectuate the same.

SUMMARY OF DISCLOSURE

In one implementation, a computer-implemented method includes establishing a text-based communication session between a first user and one or more other users of a social network. A private ID is identified for a specific user chosen from the one or more other users. One or more remote contact databases are queried to associate the private ID with one or more telephone numbers for the specific user. The one or more remote contact databases are included within one or more client electronic devices associated with the one or more other users. An SMS communication session is enabled between the first user and the specific user based, at least in part, upon the one or more telephone numbers. A local contact database is updated to include the one or more telephone numbers for the specific user.

In another implementation, a computer-implemented method includes establishing a text-based communication session between a first user and one or more other users of a social network. A private ID is identified for a specific user chosen from the one or more other users. One or more remote contact databases are queried to associate the private ID with one or more telephone numbers for the specific user. An SMS communication session is enabled between the first user and the specific user based, at least in part, upon the one or more telephone numbers.

One or more of the following features may be included. The one or more telephone numbers may include a cellular telephone number. The one or more telephone numbers may be filtered to identify a cellular telephone number. A local contact database may be updated to include the one or more telephone numbers for the specific user. The local contact database may be included within a client electronic device associated with the first user. The client electronic device associated with the first user may be a cellular telephone. The one or more remote contact databases may be included within one or more client electronic devices associated with the one or more other users. The one or more client electronic devices associated with the one or more other users may be cellular telephones. The one or more remote contact databases may be included within one or more server computers associated with the social network. The private ID may be associated with a public ID.

In another implementation, a computing system including a processor and memory is configured to perform operations including establishing a text-based communication session between a first user and one or more other users of a social network. A private ID is identified for a specific user chosen from the one or more other users. One or more remote contact databases are queried to associate the private ID with one or more telephone numbers for the specific user. An SMS communication session is enabled between the first user and the specific user based, at least in part, upon the one or more telephone numbers.

One or more of the following features may be included. The one or more telephone numbers may include a cellular telephone number. The one or more telephone numbers may be filtered to identify a cellular telephone number. A local contact database may be updated to include the one or more telephone numbers for the specific user. The local contact database may be included within a client electronic device associated with the first user. The client electronic device associated with the first user may be a cellular telephone. The one or more remote contact databases may be included within one or more client electronic devices associated with the one or more other users. The one or more client electronic devices associated with the one or more other users may be cellular telephones. The one or more remote contact databases may be included within one or more server computers associated with the social network. The private ID may be associated with a public ID.

In another implementation, a computer-implemented method includes receiving a text-message for a first user of a social network from an unknown telephone number. One or more remote contact databases are queried to associate the unknown telephone number with a private ID. A specific user of the social network is identified for the private ID.

One or more of the following features may be included. A local contact database may be updated to include the unknown telephone number for the specific user. The local contact database may be included within a client electronic device associated with the first user. The one or more remote contact databases may be included within one or more client electronic devices associated with one or more users of the social network. The one or more remote contact databases may be included within one or more server computers associated with the social network.

In another implementation, a computing system including a processor and memory is configured to perform operations including receiving a text-message for a first user of a social network from an unknown telephone number. One or more remote contact databases are queried to associate the unknown telephone number with a private ID. A specific user of the social network is identified for the private ID.

One or more of the following features may be included. A local contact database may be updated to include the unknown telephone number for the specific user. The local contact database may be included within a client electronic device associated with the first user. The one or more remote contact databases may be included within one or more client electronic devices associated with one or more users of the social network. The one or more remote contact databases may be included within one or more server computers associated with the social network.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
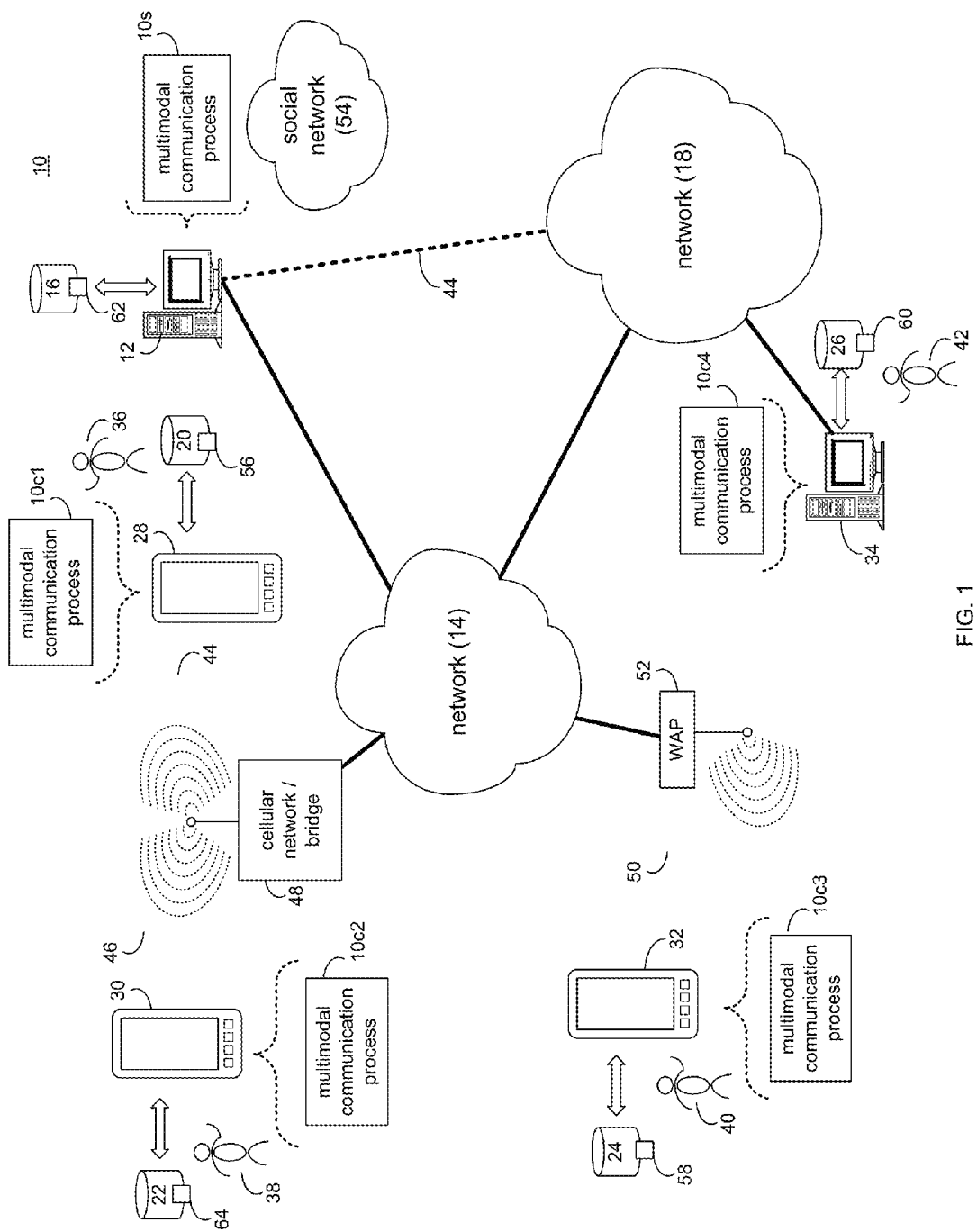
FIG. 1 is a diagrammatic view of a distributed computing network including a computing device that executes a multimodal communication process according to an implementation of the present disclosure.
Figure 2:
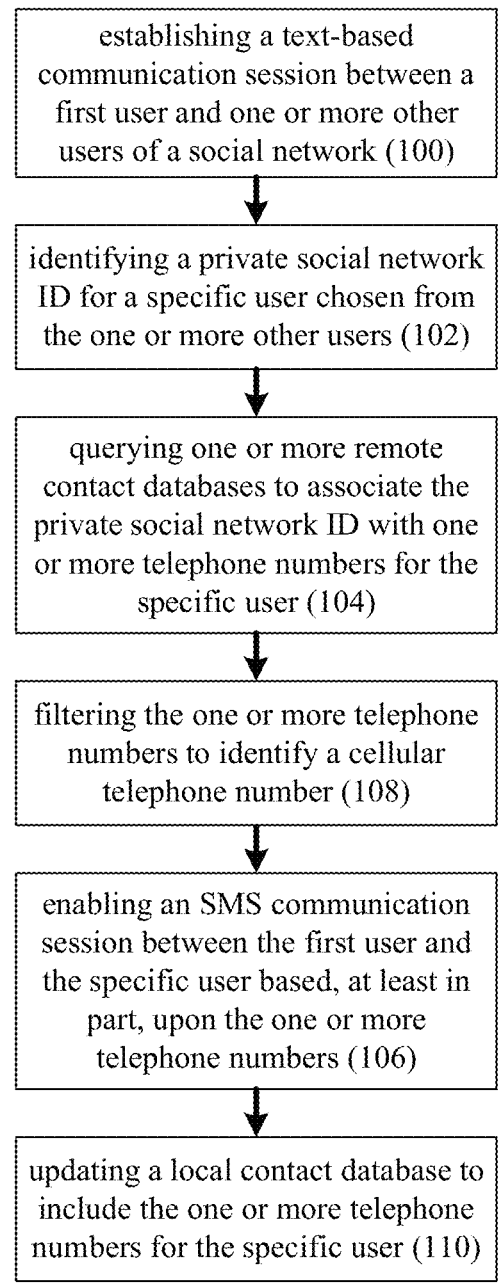
FIG. 2 is a flowchart of the multimodal communication process of FIG. 1 according to an implementation of the present disclosure.

In FIGS. 1-2, there is shown multimodal communication process 10. Multimodal communication process 10 may be implemented as a server-side process, a client-side process, or a hybrid server-side/client-side process. For example, multimodal communication process 10 may be implemented as a purely server-side process via multimodal communication process 10s. Alternatively, multimodal communication process 10 may be implemented as a purely client-side process via one or more of multimodal communication process 10c1, multimodal communication process 10c2, multimodal communication process 10c3, and multimodal communication process 10c4. Alternatively still, multimodal communication process 10 may be implemented as a hybrid server-side/client-side process via multimodal communication process 10s in combination with one or more of multimodal communication process 10c1, multimodal communication process 10c2, multimodal communication process 10c3, and multimodal communication process 10c4. Accordingly, multimodal communication process 10 as used in this disclosure may include any combination of multimodal communication process 10s, multimodal communication process 10c1, multimodal communication process 10c2, multimodal communication process 10c3, and multimodal communication process 10c4.

As will be discussed below in greater detail, multimodal communication process 10 may establish 100 a text-based communication session between a first user and one or more other users of a social network. Multimodal communication process 10 may identify 102 a private ID for a specific user chosen from the one or more other users. Multimodal communication process 10 may query 104 one or more remote contact databases to associate the private ID with one or more telephone numbers for the specific user. Multimodal communication process 10 may enable 106 an SMS communication session between the first user and the specific user based, at least in part, upon the one or more telephone numbers.

Multimodal communication process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of multimodal communication process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of multimodal communication processes 10c1, 10c2, 10c3, 10c4 may include but are not limited to a web browser, a game console user interface, a video conference user interface, a social network user interface, or a specialized application. The instruction sets and subroutines of multimodal communication processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, data-enabled, cellular telephone 30, personal digital assistant 32, personal computer 34, a laptop computer (not shown), a notebook computer (not shown), a server computer (not shown), a gaming console (not shown), a television (not shown), a tablet computer (not shown) and a dedicated network device (not shown). Client electronic devices 28, 30, 32, 34 may each execute an operating system.

Users 36, 38, 40, 42 may access multimodal communication process 10 directly through network 14 or through secondary network 18. Further, multimodal communication process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and data-enabled, cellular telephone 30 are shown wirelessly coupled to network 14 via wireless communication channels 44, 46 (respectively) established between data-enabled, cellular telephone 28, data-enabled, cellular telephone 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks (e.g., social network 54) may be able to participate in multi-user, text-based communication systems (such as a text message session). These multi-user, text-based communication systems may be proprietary systems that may be configured for exclusive use within social network 54. Accordingly, in the event that a user of social network 54 also wishes to communicate via a non-proprietary, text-based communication system (such as a standard SMS text messaging system), the user may need to exit social network 54 to effectuate the same.

During such text message sessions within social network 54, the various participants may exchange text-based messages with each other. For the following discussion, multimodal communication process 10 may be included within social network 54, a portion of social network 54, utilized by social network 54 and/or a stand-alone application that interfaces with social network 54.

Assume for illustrative purposes that users 36, 38, 40, 42 are all members of social network 54. Further assume that user 36, user 38, user 40 and user 42 wish to participate in a text-based communication system within social network 54

Figure 3:
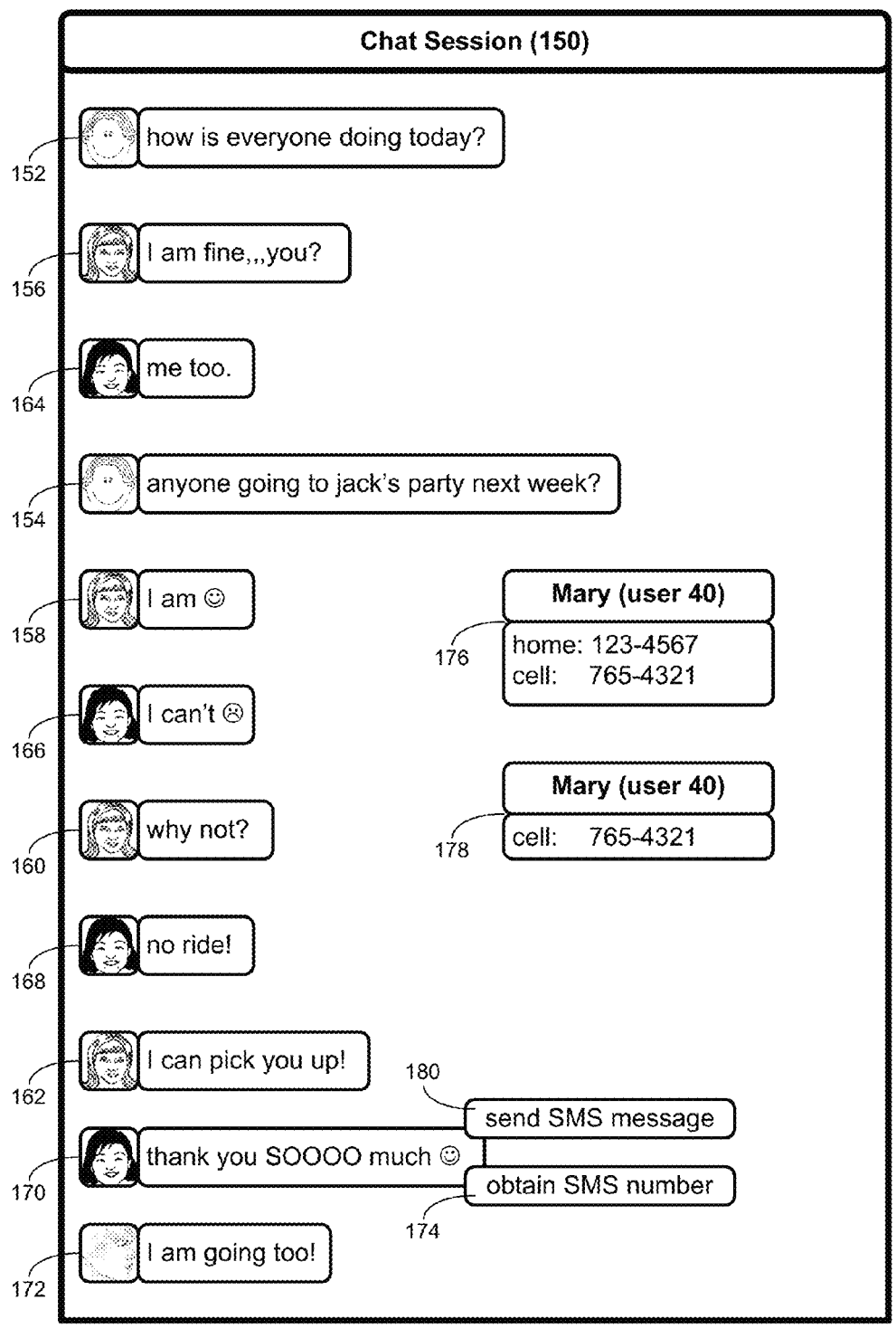
FIG. 3 is a diagrammatic representation of a text-based communication session established by the multimodal communication process of FIG. 1 according to an implementation of the present disclosure.

Referring also to FIG. 3, multimodal communication process 10 may establish 100 a text-based communication session between a first user (e.g., user 38) and one or more other users (e.g., users 36, 40, 42) of social network 54. For example, multimodal communication process 10 may render user interface 150 for use during the above-described text-based communication session, thus allowing users 36, 38, 40, 42 to exchange text-based messages 152, 154 (from user 36), text-based messages 156, 158, 160, 162 (from user 38), text-based messages 164, 166, 168, 170 (from user 40), and text-based message 172 (from user 42) with each other.

As shown in message 162, user 38 offered to drive user 40 to the party being discussed. Accordingly, user 38 may be interested in knowing the home address of user 40. However, user 38 may not wish to ask for such information (which may be confidential) in a public forum. Further, user 40 may not wish to disclose such information in a public forum. Accordingly, user 38 may wish to send a message to user 40 outside of the proprietary multi-user, text-based communication system of social network 54 (such as via a standard SMS text messaging system). However, user 38 may not be aware of a phone number (for user 40) to which user 38 may send a text message.

Multimodal communication process 10 may be configured to allow user 38 to obtain such a phone number for user 40 (if such information is available). This process may be initiated by e.g., user 38 selecting (e.g., by clicking or tapping on) message 170 (e.g., a message from user 40). Such action by user 38 may result in the generation of submenu 174, which may include the option "obtain SMS number". If user 38 selects this option, multimodal communication process 10 may identify 102 a private ID for a specific user (e.g., user 40) chosen from the one or more other users (users 36, 40, 42) participating in the above-described text-based communication session. This private ID may be associated with a public ID (e.g., for user 40). For example, since user 38 is communicating with user 40, the public ID of user 40 is known. For example, assume that the public ID for user 40 is Mary. Since there may be many people named Mary within social network 54, when establishing an account for Mary, social network 54 may assign a private ID that is unique within social network 54 (even though Mary's public ID is not). Assume for illustrative purposes that Mary's private ID is 126423.78211. Social network 54 may be configured so that this private ID (e.g., 126423.78211) is hidden from everyone. Accordingly, Mary may not even know that her private ID is 126423.78211. However, multimodal communication process 10 may be configured so that it may identify 102 the private ID (e.g., 126423.78211) for Mary (e.g., user 40)

Once identified 102, multimodal communication process 10 may query 104 one or more remote contact databases to associate the private ID (e.g., 126423.78211) with one or more telephone numbers for the specific user (e.g., Mary, user 40). Accordingly, these remote contact databases may identify Mary (e.g., user 40) by her private ID (e.g., 126423.78211). As discussed above, this private ID (e.g., 126423.78211) may be in hidden field and not publically available (or visible) within these remote contact databases. In the event that any of the records in these remote contact databases includes this private ID (e.g., 126423.78211), the telephone numbers defined within those records may be provided to multimodal communication process 10 as the result set of query 104.

The above-described remote contact databases may be included within one or more client electronic devices (e.g., client electronic device 28, 32, 34) associated with the one or more other users (e.g., users 36, 40, 42). For example, contact databases 56, 58, 60 may be included within/stored upon storage devices 20, 24, 26 coupled to client electronic device 28, 32, 34 (respectively). When configured in this fashion, contact databases 56, 58, 60 may represent/define the users of social network 54 that are known by an individual user (e.g., user 36, user 40 or user 42) of social network 54.

Alternatively, the above-described remote contact databases may be included within one or more server computers (e.g., computing device 12) associated with social network 54. For example, contact database 62 may be included within/stored upon storage device 16 coupled to computing device 12. When configured in this fashion, contact database 62 may represent/define all of the users of social network 54.

The one or more telephone numbers provided as a result of query 104 may include a cellular telephone number. As cellular telephone numbers are the numbers most likely to be capable of receiving an SMS text message, multimodal communication process 10 may filter 108 these telephone numbers to identify a cellular telephone number. This filtering 108 may occur by looking at the field titles associated with the records from which the phone numbers were extracted. Alternatively, multimodal communication process 10 may provide the above-described phone numbers in an unfiltered fashion. Assuming that one of the above-described phone numbers is capable of communicating via SMS text messaging, multimodal communication process 10 may enable 106 an SMS communication session between the first user (e.g., user 38)

and the specific user (e.g., user 40) based, at least in part, upon one or more of the above-described telephone numbers.

Continuing with the above-stated example, assume that user 36 includes a record in their contact database (contact database 56 included within/stored upon storage device 20 that is coupled to client electronic device 28) that defines two phone numbers for user 40 (Mary), one which is associated with a field name "home" and one which is associated with a field name "cell". In the event that these numbers are provided by multimodal communication process 10 to user 38 in an unfiltered fashion, result set 176 may be provided to user 38 that includes two phone numbers (i.e., the cell phone number and the home phone number). In the event that these numbers are provided by multimodal communication process 10 to user 38 in a filtered fashion, result set 178 may be provided to user 38 that includes one phone number (i.e., only the cell phone number).

Through the use of one or more of the above-described phone numbers, multimodal communication process 10 may enable 106 an SMS communication session between user 38 and user 40. For example and now that one or more phone numbers have been obtained for user 40, user 38 may select (e.g., by clicking or tapping on) message 170, which may result in the generation of submenu 180, which may now include the option "send SMS message". In the event that user 38 selects this option, a SMS text messaging window (not shown) may be rendered for user 38 that allows user 38 to initiate such an SMS communication session with user 40.

Multimodal communication process 10 may update 110 a local contact database to include the one or more telephone numbers for the specific user (e.g., user 40). For example, contact database 64 may be included within a client electronic device (e.g., client electronic device 30) associated with the first user (e.g., user 38), namely the user who requested the phone numbers for user 40. Accordingly, a record within contact database 64 may be added/amended to define the phone number(s) associated with user 40. Contact database 64 may be included within/stored upon storage device 22 coupled to client electronic device 30.

While multimodal communication process 10 is described above as being configured to identify the phone number that is associated with a user of social network 54, other configurations are possible and are considered to be within the scope of this disclosure. For example, multimodal communication process 10 may be configured to identify the user of social network 54 that is associated with a phone number.

Figure 4:
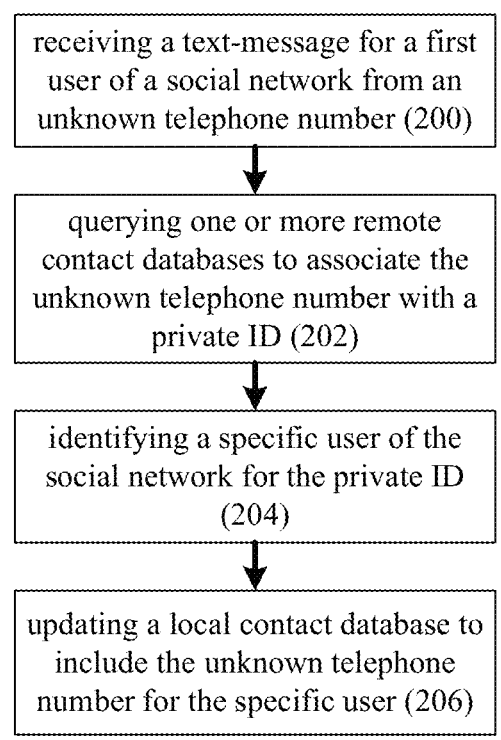
FIG. 4 is a flowchart of another implementation of the multimodal communication process of FIG. 1 according to an implementation of the present disclosure.
Figure 5:
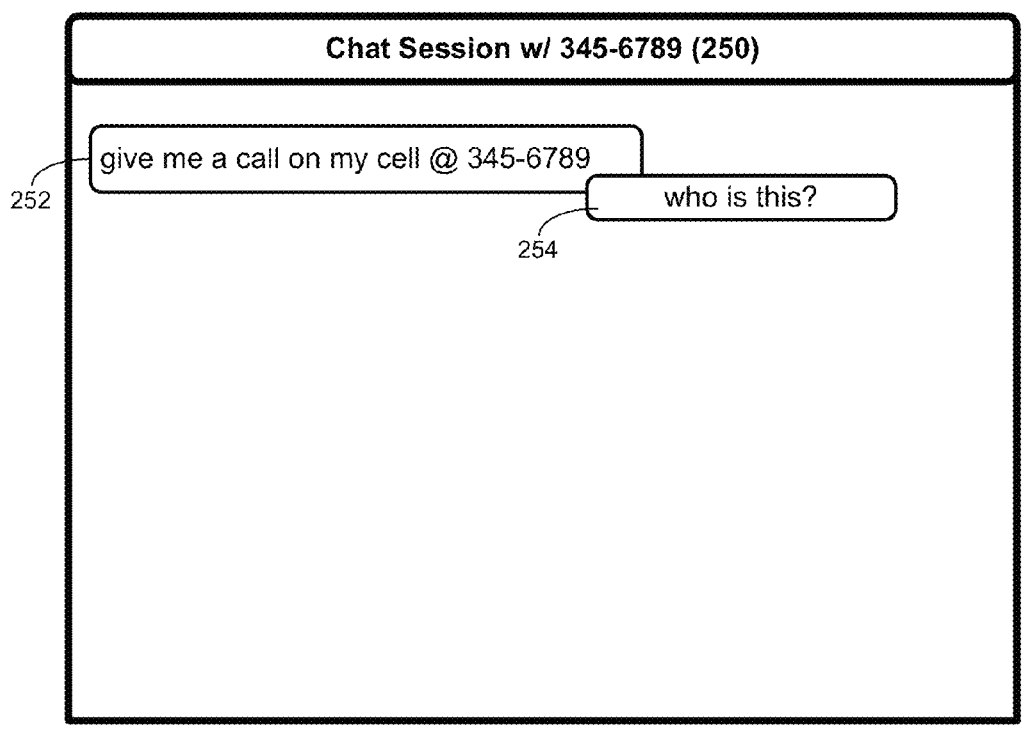
FIG. 5 is a diagrammatic representation of a text-based communication session established by the multimodal communication process of FIG. 4 according to an implementation of the present disclosure.

Accordingly and referring also to FIGS. 4-5, multimodal communication process 10 may receive 200 a text-message for a first user of social network 54 from an unknown telephone number. Continuing with the above-stated example, assume that user 38 initiates the above-described SMS communication session and uses data-enabled, cellular telephone 30 to send an SMS text message to user 40. Multimodal communication process 10 may render user interface 250, which may display text message 252 sent by user 38 to user 40 (namely "give me a call on my cell @ 345-6789"). However, assume that user 40 does not know the cell phone number of user 38 (namely 345-6789) and, therefore, user 40 would not know the identity of the sender of text message 252.

Multimodal communication process 10 may be configured to allow user 40 to determine the name of the person associated with cell phone number 345-6789 (if such information is available). This process may be initiated by e.g., user 40 selecting (e.g., by clicking or tapping on) text message 252 (e.g., the text message from user 38). Such action by user 40 may result in the generation of submenu 254, which may include the option "who is this?" If user 40 selects this option, multimodal communication process 10 may query 202 one or more remote contact databases to associate the unknown cell phone number (namely 345-6789) with a private ID.

For example, multimodal communication process 10 may query 202 one or more of contact databases 56, 60, 62, 64 to associate the unknown cell phone number (namely 345-6789) with a private ID. Assume for illustrative purposes that multimodal communication process 10 associates cell phone number 345-6789 with private ID 126423.78211.

Once the private ID associated with cell phone number 345-6789 is determined, multimodal communication process 10 may identify 204 a specific user of social network 54 for private ID 126423.78211, namely user 38. Multimodal communication process 10 may update 206 a local contact database (e.g., contact database 58) to include the unknown cell phone number (namely 345-6789) for the specific user (e.g., user 38).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   establishing, by one or more hardware processors, a text-based communication session between a first user and one or more other users of a social network;
   identifying, by the one or more hardware processors, a private identifier (ID) for a specific user chosen from the one or more other users;
   querying, by the one or more hardware processors, one or more remote contact databases to associate the private ID with one or more telephone numbers for cellular telephones for the specific user based on a respective field title of a record of the one or more remote contact databases from which a respective telephone number of the one or more telephone numbers was extracted, wherein the one or more remote contact databases are included within one or more client electronic devices associated with the one or more other users;
   enabling a short messaging service (SMS) communication session between the first user and the specific user based, at least in part, upon the one or more telephone numbers; and
   updating, by the one or more hardware processors, a local contact database to include the one or more telephone numbers for the specific user.

2. A computer-implemented method comprising:
   establishing, by one or more hardware processors, a text-based communication session between a first user and one or more other users of a social network to discuss an event that occurs outside of the social network;
   identifying, by the one or more hardware processors, a private identifier (ID) for a specific user chosen from the one or more other users;
   querying, by the one or more hardware processors, one or more remote contact databases to associate the private ID with one or more telephone numbers for cellular telephones for the specific user based on a respective field title of a record of the one or more remote contact databases from which a respective telephone number of the one or more telephone numbers was extracted; and enabling a short messaging service (SMS) communication session between the first user and the specific user based, at least in part, upon the one or more telephone numbers.

3. The computer-implemented method of claim 2 further comprising:

updating a local contact database to include the one or more telephone numbers for the specific user.

4. The computer-implemented method of claim 3 wherein the local contact database is included within a client electronic device associated with the first user.

5. The computer-implemented method of claim 4 wherein the client electronic device associated with the first user is a cellular telephone.

6. The computer-implemented method of claim 2 wherein the one or more remote contact databases are included within one or more client electronic devices associated with the one or more other users.

7. The computer-implemented method of claim 6 wherein the one or more client electronic devices associated with the one or more other users are cellular telephones.

8. The computer-implemented method of claim 2 wherein the one or more remote contact databases are included within one or more server computers associated with the social network.

9. The computer-implemented method of claim 2 wherein the private ID is associated with a public ID.

10. A computing system comprising:

one or more hardware processors coupled to a non-transitory memory;

a multimodal communication application stored in the non-transitory memory and executable by the one or more hardware processors, the multimodal communication application configured to perform operations comprising:

establishing a text-based communication session between a first user and one or more other users of a social network to discuss an event that occurs outside of the social network;

identifying a private identifier (ID) for a specific user chosen from the one or more other users;

querying one or more remote contact databases to associate the private ID with one or more telephone numbers for cellular telephones for the specific user based on a respective field title of a record of the one or more remote contact databases from which a respective telephone number of the one or more telephone numbers was extracted; and enabling a short messaging service (SMS) communication session between the first user and the specific user based, at least in part, upon the one or more telephone numbers.

11. The computing system of claim 10 wherein the multimodal communication application is further configured to perform operations comprising:

updating a local contact database to include the one or more telephone numbers for the specific user.

12. The computing system of claim 11 wherein the local contact database is included within a client electronic device associated with the first user.

13. The computing system of claim 12 wherein the client electronic device associated with the first user is a cellular telephone.

14. The computing system of claim 10 wherein the one or more remote contact databases are included within one or more client electronic devices associated with the one or more other users.

15. The computing system of claim 14 wherein the one or more client electronic devices associated with the one or more other users are cellular telephones.

16. The computing system of claim 10 wherein the one or more remote contact databases are included within one or more server computers associated with the social network.

17. The computing system of claim 10 wherein the private ID is associated with a public ID.

\* \* \* \* \*